United States Patent
Chamaret et al.

(10) Patent No.: US 9,478,044 B2
(45) Date of Patent: Oct. 25, 2016

(54) METHOD AND APPARATUS OF CREATING A PERCEPTUAL HARMONY MAP

(71) Applicant: THOMSON LICENSING, Issy de Moulineaux (FR)

(72) Inventors: Christel Chamaret, Chantepie (FR); Fabrice Urban, Thorigne Fouillard (FR); Yoann Baveye, Saint-Ave (FR)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 14/780,594

(22) PCT Filed: Mar. 26, 2014

(86) PCT No.: PCT/EP2014/056069
§ 371 (c)(1),
(2) Date: Sep. 28, 2015

(87) PCT Pub. No.: WO2014/154753
PCT Pub. Date: Oct. 2, 2014

(65) Prior Publication Data
US 2016/0055655 A1    Feb. 25, 2016

(30) Foreign Application Priority Data

Mar. 28, 2013  (EP) ..................................... 13305394

(51) Int. Cl.
*G06K 9/34*    (2006.01)
*G06T 7/40*    (2006.01)
(Continued)

(52) U.S. Cl.
CPC .............. *G06T 7/408* (2013.01); *G06T 5/005* (2013.01); *G06T 7/0081* (2013.01); *G06T 2207/10004* (2013.01); *G06T 2207/10024* (2013.01); *G06T 2207/30168* (2013.01)

(58) Field of Classification Search
USPC ....... 382/162, 164, 297, 299, 128, 274, 224, 382/195, 199; 345/582; 600/558
See application file for complete search history.

(56) References Cited

U.S. PATENT DOCUMENTS 7,023,447 B2 * 4/2006 Luo ...................... G06T 11/001
                                                  345/582
8,867,844 B2 * 10/2014 Van Beek ............ G06K 9/6211
                                                  382/199
(Continued)

FOREIGN PATENT DOCUMENTS

EP    1748385    1/2007
EP    1764736    3/2007
(Continued)

OTHER PUBLICATIONS

Baveye et AL: "Saliency guided consistent color harmonization"; Computational Color Imaging, vol. 7786, Mar. 3, 2013 (Mar. 3, 2013); pp. 105-118.
(Continued)

*Primary Examiner* — Anh Do
(74) *Attorney, Agent, or Firm* — Meagher Emanuel Laks; Goldberg & Liao, LLP

(57) ABSTRACT

The present invention generally relates to a method and apparatus for creating an harmony map of an image. It also relates to a method and apparatus for assessing the quality of an image. The invention also relates to a method and apparatus for assessing the quality of an image such that an assessment score of the image is obtained from a perceptual map of the image created from the previous method. As an interesting tool for content creator and in the goal of maximizing the artistic effect, the proposed method provides perceptual harmony-guided quality map as well as a score of disharmony of a picture without reference image. The method links two distinct subjects: perceptual quality metric and harmonious hue templates in order to provide new tools to content creator whatever the expertise level.

7 Claims, 2 Drawing Sheets

Figure 1:
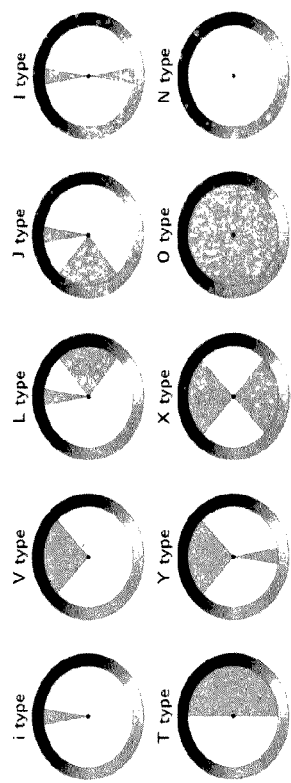

(51) Int. Cl.
*G06T 5/00* (2006.01)
*G06T 7/00* (2006.01)

(56) References Cited

U.S. PATENT DOCUMENTS

| 8,879,813 B1* | 11/2014 | Solanki | G06T 7/0014 382/128 |
|---|---|---|---|
| 9,002,085 B1* | 4/2015 | Solanki | G06T 7/0014 382/128 |

FOREIGN PATENT DOCUMENTS

| EP | 1936566 | 6/2008 |
|---|---|---|
| EP | 2141658 | 1/2010 |
| WO | WO2005059832 | 6/2005 |

OTHER PUBLICATIONS

Chamaret et AL: "No reference harmony guided quality assessment"; 2013 IEEE Conference on Computer Vision and Pattern Recognition Workshops, IEEE; Jun. 23, 2013 (Jun. 3, 2013); pp. 961-967.

Cohen et AL:"Color Harmonization"; ACM SIGGRAPH 2006 Courses on, SIGGRAPH 0601 Jan. 2006 (Jan. 1, 2006), p. 624-630.
Huo et AL: "An improved method for color harmonization"; Image and Signal Processing, 2009CISP 092nd International Congress on, IEEE, Oct. 17, 2009 (Oct. 17, 2009)pp. 1-4.
Datta et AL: "Studying aesthetics in photographic images using a computational approach"; in Proceedings of the 9th European Conference on Computer Vision—vol. Part III, ECCV'06, pp. 288-301.
Fedorovskaya et AL: Abstract: "Image harmony for consumer images"; In Image Processing, 15th IEEE International Conference, 2008; pp. 121-124.
Itten: "The Elements of Color"; The art of color the subjective experience and objective rationale of color; Van Nostrand Reinholdl pp. 1-98.
Ninassi et AL: "On the performance of human visual system based image quality assessment metric using wavelet domain"; pp. 1-12.
Moon et AL: "Geometric Formulation of Classical Color Harmony"; Journal of Optical Soc. Am., vol. 34(1): pp. 46-50, 1944.
Tokumaru et al: "Color Design Support System Considering Color Harmony"; IEEE; 2002; pp. 378-383.
Search Report Dated Sep. 23, 2014.

* cited by examiner

METHOD AND APPARATUS OF CREATING A PERCEPTUAL HARMONY MAP

This application claims the benefit, under 35 U.S.C. §365 of International Application PCT/EP2014/056069, filed Mar. 26, 2014, which was published in accordance with PCT Article 21(2) on Oct. 2, 2014 in English and which claims the benefit of European patent application No. 13305394.2, filed Mar. 28, 2013.

1. FIELD OF INVENTION

The present invention generally relates to a method and apparatus for creating an harmony map of an image. It also relates to a method and apparatus for assessing the quality of an image.

2. TECHNICAL BACKGROUND

When manipulating, editing, improving image, the best quality as well as a certain artistic intent are usually the finality. Nevertheless, although the issues related to objective quality assessment have been widely studied in the context of low level artefacts (such as blur, blockiness, jitter, . . . ), the artistic intent is a problem somehow more tricky and subjective leading to high difficulties in modeling or generalization.

As an intermediate indicator, aesthetic quality metric based on features (colorfulness, line orientation, shape, . . . ) intuitively related to beauty and rules (composition, rules-of-third, skyline, . . . ) are showing up recently in the community.

Depending on the application context, some approaches take advantage of a reference source or do the best effort without any reference when providing an absolute quality measurement.

The problem solves by the invention is to define a method for assessing the color harmony of an image and for assessing what the quality of an image (picture) is.

3. SUMMARY OF THE INVENTION

The invention solves this problem by defining a method for creating a perceptual harmony map of an image which comprises:
 calculating a multi-resolution decomposition of the image,
 at each resolution level,
 for each harmonious color template, computing an optimal rotation angle and an harmony distance for the hue value associated with each pixel of the image at the resolution level, and computing a harmony distance map by weighting the sum of said harmony distances,
 calculating a contrast map and an entropy activity map,
 obtaining a perceptual harmony map by integrating together the contrast map the entropy activity map and the harmony distance map, and
 obtaining the perceptual map by accumulating the perceptual harmony maps.

The invention also relates to a method for assessing the quality of an image characterized in that an assessment score of the image is obtained from a perceptual map of the image created from the previous method.

As an interesting tool for content creator and in the goal of maximizing the artistic effect, the proposed method provides perceptual harmony-guided quality map as well as a score of disharmony of a picture without reference image.

The method links two distinct subjects: perceptual quality metric and harmonious hue templates in order to provide new tools to content creator whatever the expertise level.

The multi-resolution decomposition of the image is processed to calculate a perceptual harmony map at different resolutions of the image in order to mimic the human visual system.

Moreover, each perceptual harmony map is obtained by applying masking functions to the harmony distance map or, in other words, by integrating together the contrast map, the entropy activity map and the harmony distance map. Such masking of the harmony distance map provides information regarding local and global visibility.

The specific nature of the invention as well as other objects, advantages, features and uses of the invention will become evident from the following description of a preferred embodiment taken in conjunction with the accompanying drawings.

4. LIST OF FIGURES

Figure 2:
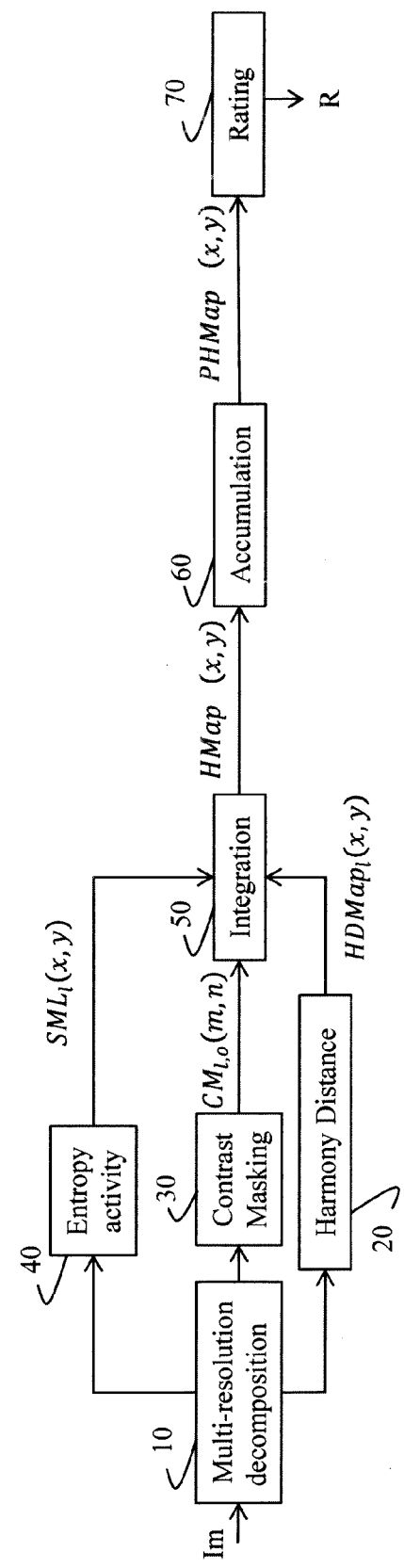
Figure 3:
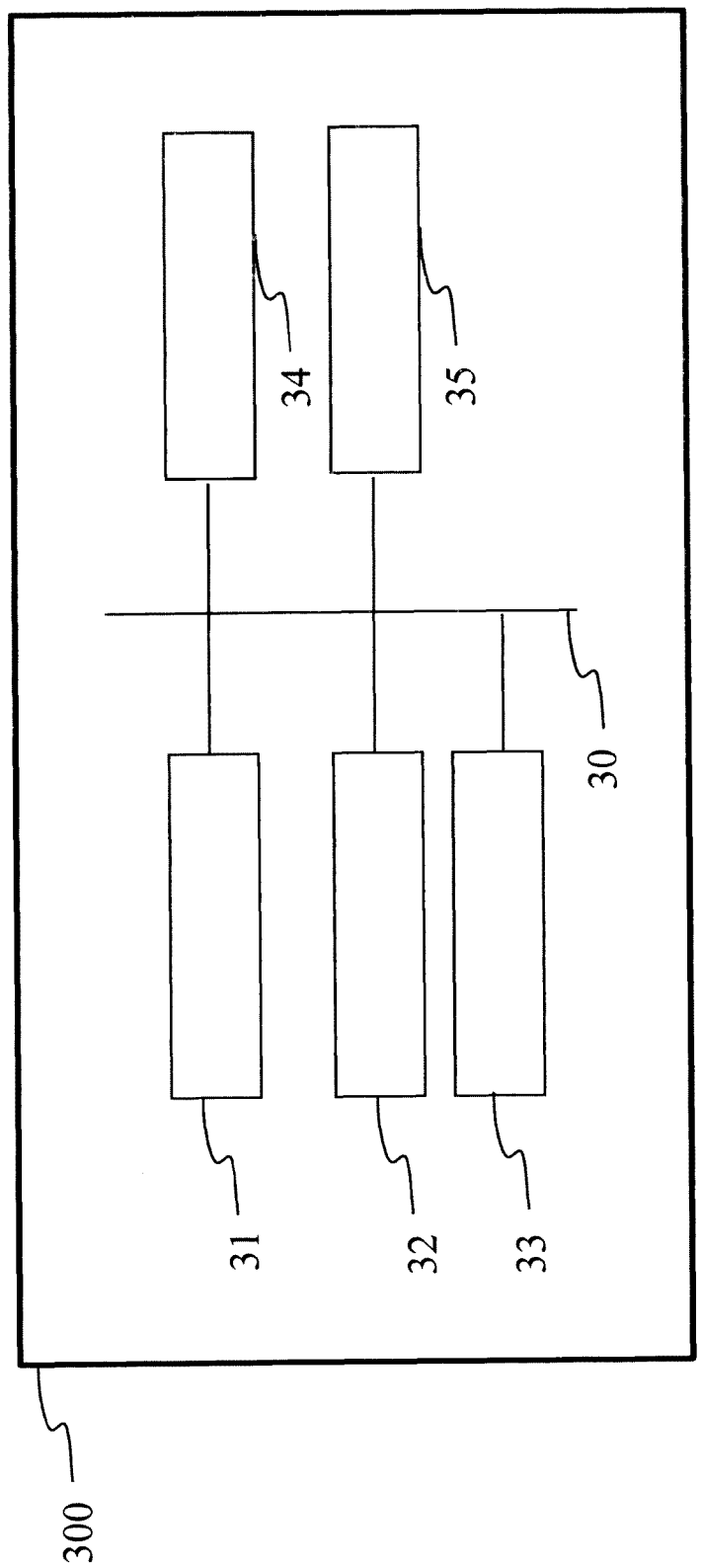

The embodiments will be described with reference to the following figures:
 FIG. 1 represents color templates;
 FIG. 2 depicts a flowchart of the processing method for creating a perceptual harmony map of an image; and
 FIG. 3 depicts a device according comprising means to implement the method for creating a perceptual harmony map of the image.

5. DETAILED DESCRIPTION OF A PREFERRED EMBODIMENT OF THE INVENTION

Harmony is a subjective concept whose difficulties lie on its definition and its measurement. Fedorovskaya et al. (E. Fedorovskaya, C. Neustaedter, and W. Hao. *Image harmony for consumer images. In Image Processing,* 2008. ICIP 2008. 15$^{th}$ *IEEE International Conference on*, pages 121-124, October) investigated through a series of experiments the identification of some image features involving harmony (dis)comfort. They found out that edge contrast, average lightness, range of lightness . . . may influence global harmony appreciation. Despite this previous reference, most of harmony investigations in image processing field relates to color combinations and complementaries. Starting with Itten contrast measurement where harmonious doublets and triplets of color are defined (J. Itten. *The art of color: the subjective experience and objective rationale of color. Van Nostrand Reinhold,* New York, 1973.), Matsuda (Y. Matsuda. *Color design, Asakura Shoten,* 1995) extended this work by defining HSV (Hue, Saturation, Value)-based templates that predict set of harmonious hues within an image.

An harmonious color template is thus a set of HSV values (hue, saturation and value) that are considered as rendering/reflecting a global harmonious effect when present at the same time. Height harmonious color templates $T_m$ (m∈{i, I, L, T, V, X, Y, J}) are used as depicted on FIG. 1. The harmonious color templates O and N are not used. Each harmonious color template $T_m$ is made of different portions/sectors to handle color complementary, color orthogonality and set of close hues. Each sector has a center $\alpha_m$ and a size $w_m$. A harmonious color template may be turned around the hue wheel. Thus an harmonious color template is defined by a template type and a sector angle $\alpha_m$.

A complete implementation of the invention is depicted in FIG. 2. One can notice that the following method can be extended to video source by applying same process to consecutive frames.

At step 10, a multi-resolution decomposition of the image is calculated.

For example, a Discrete Wavelet Transform (DWT) which has proven to be efficient both in term of prediction and computation performances (A. Ninassi, O. LeMeur, P. Le Callet, and D. Barba. *On the performance of human visual system based image qual-ity assessment metric using wavelet domain.* Pages 680610-680610-12, 2008.). A CDF 9/7 (Cohen-Daubechies-Feauveau) kernel may be used.

Each decomposition level comprises three orientation subbands (horizontal, vertical, and oblique frequencies). The spatial frequency range of a decomposition level $l\in[0; L-1]$ is $[2^{-(l+1)} \cdot f_{max}; 2^{-l} \cdot f_{max}]$ where $f_{max}$ is the maximum spatial frequency of an input image Im.

At step 20, at each resolution level l, for each harmonious color template $T_m$, an optimal rotation angle $\alpha_{m,l}$ is computed and an harmony distance $HD_{m,l}(h)$ is computed for the hue value h associated with each pixel (x,y) of the image Im at the resolution level l. A harmony distance map $HDMap_l(x,y)$ is then calculated for each pixel of the image Im at the resolution level l by weighting the sum of said harmony distances $HD_{m,l}(h)$.

According to an embodiment, the optimal rotation angle $\alpha_{m,l}$ which is computed for a harmonious color template $T_m$ minimizes the energy $E_{\alpha_{m,l}}$ defined by the Kullback-Liebler divergence between the original hue distribution $M_{h,l}$ of the image Im at the resolution level l and the distribution $P_{h,l}(m, \alpha_{m,l})$ of the harmonious color template $T_m$ for the angle $\alpha_{m,l}$ such as described, for example by Baveye et al. (Y. Baveye, F. Urban, C. Chamaret, V. Demoulin, and P. Hellier. *Saliency-guided consistent color harmonization.* In S. Tominaga, R. Schettini, and A. Trmeau, editors, *Computational Color Imaging*, volume 7786 of *Lecture Notes in Computer Science*, pages 105-118. Springer Berlin Heidelberg, 2013).

Note that the distributions $M_{h,l}$ and $P_{h,l}(m, l, \alpha_{m,l})$ may be considered as being histograms with 360 bins.

The distributions $M_{h,l}$, i.e. the color histogram $M_{h,l}$, is computed in the HSV space as a normalized hue distribution weighted by saturation S(x,y) and value V(x,y):

$$M_{h,l} = \frac{1}{\Sigma_{(x,y)} S[x,y] * V[x,y]} * \sum_{(x,y)\in\{(u,v)|H[u,v]=h\}} S[x,y] * V[x,y]$$

where (x,y) is a pixel belonging to the image Im at each resolution level l.

Mathematically speaking, the energy $E_{\alpha_{m,l}}$ is given by:

$$E_{\alpha_{m,l}} = \min_\alpha \sum_h M_{h,l} \times \ln\left(\frac{M_{h,l}}{P_{h,l}(m,\alpha)}\right)$$

with the distribution $P_{h,l}(m, \alpha)$ for a harmonious color template $T_m$ with n sectors is given by:

$$P_{h,l}(m,\alpha) = \sum_{k=1}^{n} S_k(m,\alpha_k)$$

and a distribution of a sector $S_k(m, \alpha_k)$ given for each bin value i by:

$$\begin{cases} \exp\left(-\frac{1}{1-\left(\frac{2\times\|i-\alpha_k\|}{w_k}\right)^2}\right) & \text{si } h \in \left[\alpha_k - \frac{w_k}{2}, \alpha_k + \frac{w_k}{2}\right] \\ 0 & \text{otherwise} \end{cases}$$

The invention is not limited by the way the distribution is defined.

According to an embodiment, the harmony distance $HD_{m,l}(h)$ is an arc-length distance on the hue wheel (measured in degrees) given by:

$$HD_{m,l}(h) = \begin{cases} 0 & \text{if } \|h-\alpha_k\| < \frac{w_k}{2} \\ \|h-\alpha_k\| - \frac{w_k}{2} & \text{otherwise} \end{cases}$$

where $\|\cdot\|$ is the arc-length distance, $\alpha_k$ is the closest sector center, $w_k$ its size in degrees and h is the hue value of a pixel of the image Im at a resolution level l.

According to an embodiment, the harmony distance map $HDMap_l(x,y)$ is the sum of said harmony distances $HD_{m,l}(h)$ weighted by the relative energy calculated over the harmonious color templates.

Mathematically speaking, the harmony distance map $HDMap_l(x,y)$ is given by:

$$HDMap_l(x,y) = \sum_{T_m} \frac{E_{Total} - E_{\alpha_{m,l}}}{E_{Total}} \times HD_{m,l}(h)$$

At step 30, a contrast map $(M_{l,o}(m,n)$ is calculated for each resolution level l.

The contrast map models the visibility change of the signal due to contrast values.

According to an embodiment, when a DWT is used at step 10, the contrast masking is defined as the wavelet transformed values at site (m,n), weighted by the CSF function that describes, at a resolution level l the variations in visual sensitivity to the spatial frequency and orientation o.

Mathematically speaking, given a CSF value $N_{l,o}$ as the mean value of a 2D CSF from Daly (S. Daly. *Digital images and human vision. Chapter The visible differences predictor: an algorithm for the assessment of mage*) over the spatial frequencies covered by a subband $S_{l,o}$, the contrast masking map is given by:

$$CM_{l,o}(m,n) = s_{l,o}(m,n) \cdot N_{l,o}$$

At step 40, an entropy activity map $SML_l(x,y)$ is calculated for each resolution level l.

The entropy activity map reflects the uncertainty of the image such as in texture area.

According to an embodiment, the entropy activity map $SML_l$ is evaluated by the computation of entropy on a n-by-n neighborhood.

Preferably, the entropy activity map $SML_l$ is evaluated by computing as the minimum of the directional gradients (horizontal, vertical, diagonal) for each pixel (x,y) of the image Im. Such a semi-local activity map $SML_l$ is then given by $$SML_4(x,y) = \min\left(\frac{\partial I}{\partial x}, \frac{\partial I}{\partial y}, \frac{1}{2}\cdot\left(\frac{\partial I}{\partial x}+\frac{\partial I}{\partial y}\right)\right)$$

where I is the input image.

The harmony distance maps are computed at differents resolutions level to match the HVS model.

At step 50, for each resolution level l, the contrast map $CM_{l,o}$ (m,n), the entropy activity map $SML_l(x,y)$ and the harmony distance map $HDMap_l(x,y)$ are integrated together to get a perceptual harmony map $PHDMap_l(x,y)$.

According to an example, said perceptual harmony distance map $PHDMap_l(x,y)$ is given by:

$$PHDMap_l(m, n) = \frac{HDMap_l(m, n)}{1 + \frac{1}{2}(\Sigma_o CM_{l,o}(m, n) + SML_l(m, n))}$$

where (m,n) are the coordinates corresponding to the pixel (x,y) of the image Im at resolution level l.

At step 60, the perceptual harmony maps $PHDMap_l(m,n)$ are accumulated to built a perceptual map PHMap (x,y).

Mathematically speaking, the perceptual map PHMap (x,y) is given by:

$$PHMap(x, y) = \sum_l PHDMap_l(m, n)$$

Note the perceptual map PHMap (x,y) is visually close to a harmony distance map computed by accumulating the harmony distance map $HDMap_l(x,y)$, but integrates masking effects by decreasing impact of small group of pixels.

According to an aspect of the invention, a method for assessing the quality of an image is defined by obtaining a rating or assessment score R of the image from the perceptual map PHMap (x,y) (step 70 in FIG. 2).

According to an embodiment, the rating R is computed from by means of a Minkowski summation given by:

$$R = \left(\frac{1}{W \cdot H}\sum_y^H \sum_x^W (PHMap(x, y))^\beta\right)^{\frac{1}{\beta}}$$

where W and H are respectively the width and height of the image Im and β is a parameter set for example to 2.

The color information of an image at a resolution level is carried by the lowest subband.

Consequently, according to a variant of the method, the contrast and entropy activity map are integrated with the harmony distance map at a given resolution level only for the lowest subband of this resolution level.

FIG. 3 represents an exemplary architecture of a processing device 300 according to a specific and non limiting embodiment. The processing device can be for example a tablet, a PDA or a cell phone. Processing device 300 comprises following elements that are linked together by a data and address bus 30:

- a microprocessor 31 (or CPU), which is, for example, a DSP (or Digital Signal Processor);
- a ROM (or Read Only Memory) 32;
- a RAM (or Random Access Memory) 33;
- one or several Input/Output interface(s) 35, for example a keyboard, a mouse; and
- a battery 36.

Each of these elements of FIG. 3 are well known by those skilled in the art and won't be disclosed further. The processing device 300 may comprise display means such as a screen for displaying the processed images. Algorithm of the processing method according to the invention are stored in the ROM 32. RAM 33 comprises in a register, the program executed by the CPU 31 and uploaded after switch on of the processing device 300. When switched on, the CPU 21 uploads the program in the RAM and executes the corresponding instructions. The images to be processed are received on one of the Input/Output interfaces 35. One of the Input/Output interface 35 is adapted to transmit the images processed according to the invention.

According to variants, processing devices 300 compatible with the invention are implemented according to a purely hardware realisation, for example in the form of a dedicated component (for example in an ASIC (Application Specific Integrated Circuit) or FPGA (Field-Programmable Gate Array) or VLSI (Very Large Scale Integration) or of several electronic components integrated into a device or even in a form of a mix of hardware elements and software elements.

While not explicitly described, the present embodiments and variants may be employed in any combination or sub-combination.

The invention claimed is:

1. A method performed by a device for creating a perceptual harmony map of an image from at least one harmonious color template defined by a center and at least a sector wherein the method comprises:
    calculating, by a processor, a multi-resolution decomposition of the image,
    at each resolution level,
        for each harmonious color template, computing, by said processor, an optimal rotation angle of said harmonious color template around its center and an harmony distance for the hue value associated with each pixel of the image at the resolution level, said harmony distance quantifying the distance between said hue value and a sector of said harmonious color template, and computing a harmony distance map by weighting the sum of harmony distances calculated for the harmonious color templates
        calculating, by said processor, a contrast map and an entropy activity map reflecting the uncertainty of the image,
        obtaining, by said processor, a perceptual harmony map by integrating together the contrast map the entropy activity map and the harmony distance map, and
    obtaining, by said processor, the perceptual map by accumulating the perceptual harmony maps calculated over the different resolution levels.

2. The method of claim 1, wherein an assessment score of the image is obtained, by said processor, from the perceptual map.

3. A processor readable non-transitory medium having stored therein instructions for causing a processor to perform at least the steps of the method according to claim 1.

4. A processor readable non-transitory medium having stored therein instructions for causing a processor to perform at least the steps of the method according to claim 2.

5. Non-transitory storage medium carrying instructions of program code for executing steps of the method according to claim 1, when said program is executed on a computing device.

6. Device for creating a perceptual harmony map of an image from at least one harmonious color template defined by a center and at least a sector wherein it comprises a processor configured to:
    calculate a multi-resolution decomposition of the image,
    at each resolution level, for each harmonious color template, compute an optimal rotation angle of said harmonious color template around its center and an harmony distance for the hue value associated with each pixel of the image at the resolution level, said harmony distance quantifying the distance between said hue value and a sector of said harmonious color template, and compute a harmony distance map by weighting the sum of harmony distances calculated for the harmonious color templates calculate a contrast map and an entropy activity map reflecting the uncertainty of the image, obtain a perceptual harmony map by integrating together the contrast map the entropy activity map and the harmony distance map, and obtain the perceptual map by accumulating the perceptual harmony maps calculated over the different resolution levels.

7. A device for assessing the quality of an image, wherein it comprises a processor configured to obtain an assessment score of the image from a perceptual map of the image, the device wherein the processor is further configured to:

calculate a multi-resolution decomposition of the image, at each resolution level, for each harmonious color template, compute an optimal rotation angle of said harmonious color template around its center and an harmony distance for the hue value associated with each pixel of the image at the resolution level, said harmony distance quantifying the distance between said hue value and a sector of said harmonious color template, and compute a harmony distance map by weighting the sum of harmony distances calculated for the harmonious color templates calculate a contrast map and an entropy activity map reflecting the uncertainty of the image, obtain a perceptual harmony map by integrating together the contrast map the entropy activity map and the harmony distance map, and obtain the perceptual map by accumulating the perceptual harmony maps calculated over the different resolution levels.

* * * * *